US007644112B2

(12) United States Patent
Blea et al.

(10) Patent No.: US 7,644,112 B2
(45) Date of Patent: Jan. 5, 2010

(54) APPARATUS, SYSTEM, AND METHOD FOR INITIALIZING A SYNCHRONIZED REMOTE DATABASE

(75) Inventors: David Randall Blea, Tucson, AZ (US); Errol Jay Calder, Vail, AZ (US); Gregory Edward McBride, Vail, AZ (US); Todd Benjamin Schlomer, Tucson, AZ (US); John Jay Wolfgang, Midlothian, VA (US)

(73) Assignee: International Business Machines Corporation, Armonk, NY (US)

( * ) Notice: Subject to any disclaimer, the term of this patent is extended or adjusted under 35 U.S.C. 154(b) by 253 days.

(21) Appl. No.: 11/670,336

(22) Filed: Feb. 1, 2007

(65) Prior Publication Data

US 2008/0189341 A1    Aug. 7, 2008

(51) Int. Cl.
*G06F 17/30* (2006.01)
*G06F 12/00* (2006.01)

(52) U.S. Cl. ........................................ 707/204; 707/10
(58) Field of Classification Search .............. 707/1–10, 707/200
See application file for complete search history.

(56) References Cited

U.S. PATENT DOCUMENTS

| 6,032,158 | A | 2/2000 | Mukhopadhyay et al. ... 707/201 |
| 6,212,531 | B1 | 4/2001 | Blea et al. .................. 707/204 |
| 6,529,921 | B1 | 3/2003 | Berkowitz et al. ....... 707/500.1 |
| 6,668,260 | B2 | 12/2003 | Zoltan ........................ 707/201 |
| 6,895,471 | B1 | 5/2005 | Tse et al. .................... 711/118 |
| 6,915,316 | B1 | 7/2005 | Patterson et al. ............ 707/205 |
| 2004/0098425 | A1* | 5/2004 | Wiss et al. .................. 707/204 |
| 2005/0278397 | A1* | 12/2005 | Clark ......................... 707/204 |

OTHER PUBLICATIONS

"Mirror Computing", Unknown Author, Wikipedia Online Encyclopedia, Published: Nov. 2008, 3 pgs.*
Costa-Requena, J. et al., "Replication of Routing Tables for Mobility Management in AD HOC Networks", Wireless Networks, vol. 10, No. 4, pp. 367-375, 2004.
Yinyan Cao et al., "Storage Mangement of a Historical Web Warehousing System", Database and expert systems applications 11th International Conference, Dexa 2000, Lecture Notes in Computer Science, vol. 1873, pp. 457-466, 2000.
Reid, D.J. et al., "The Propogation of Updates to Relational Tables in a Distributed Database System", Mathematical and Computer Modeling, vol. 23, No. 3, pp. 15-25, Feb. 1996.
Masunaga, Y., "Update and Query Processing Scheme in Partioned and Replicated Distributed Relational Database Systems", Proceedings of COMPSAC 87, pp. 521-530, Oct. 1987.

* cited by examiner

*Primary Examiner*—Mohammad Ali
*Assistant Examiner*—John P Hocker
(74) *Attorney, Agent, or Firm*—Kunzler & McKenzie

(57) ABSTRACT

An apparatus, system, and method are disclosed for initializing a synchronized remote database. A creation module creates a first backup table of a backup database from a schema for a primary table of a primary database. A read module reads each row from the primary table with an application server configured to manage access to the primary database by a database application. A construction module constructs a SQL command for each row of the primary table. Each SQL command inserts data of a primary table row in the first backup table. An application module applies each SQL command to the first backup table to mirror the primary table at the first backup table.

17 Claims, 7 Drawing Sheets

| | 405a | 405b | 405c |
|---|---|---|---|
| 410a | John | Doe | 245.27 |
| 410b | Jane | Doe | 16.05 |

APPARATUS, SYSTEM, AND METHOD FOR INITIALIZING A SYNCHRONIZED REMOTE DATABASE

CROSS-REFERENCE TO CO-PENDING APPLICATIONS

The subject matter of this application is related to a United States Patent Application entitled "APPARATUS, SYSTEM, AND METHOD FOR SYNCHRONIZING A REMOTE DATABASE" filed on Feb. 1, 2007 for David R. Blea et al. as Ser. No. 11/670,321.

BACKGROUND OF THE INVENTION

1. Field of the Invention

This invention relates to initializing a database and more particularly relates to initializing a synchronized remote database.

2. Description of the Related Art

Enterprise data processing systems often support database applications that store valuable information such as transaction data, customer information, inventory data, product data, financial data, and the like in databases. An enterprise data processing system may employ an application server to store databases and provide access to the databases for database applications.

For example, a database application may retrieve data from a database through an application server. Similar, the database application may store data to the database through the application server. The application server may also be configured to manage and maintain the database.

The data stored in databases is often very valuable. As a result, a database is typically synchronized with a backup copy to protect the database's data from loss and/or to provide a replacement copy. The database that is the source of synchronization data is referred to herein as a primary database. The backup copy may be synchronized with the primary database by mirroring each change made to the primary database to the backup database, database, wherein the backup database is initially synchronized with the primary database. As used herein, mirroring refers to making and/or maintaining a copy of data.

Unfortunately, because the primary database must use operational bandwidth to create an initial backup database that may be synchronized with the primary database, the performance of the primary database may be degraded. In addition, the primary database may only be capable of creating backup databases that are of the same type as the primary database, precluding backing up primary databases to other types of databases.

SUMMARY OF THE INVENTION

From the foregoing discussion, there is a need for an apparatus, system, and method that initialize a synchronized remote database. Beneficially, such an apparatus, system, and method would create a remote backup database without degrading the performance of a primary database.

The present invention has been developed in response to the present state of the art, and in particular, in response to the problems and needs in the art that have not yet been fully solved by currently available synchronized remote database creation methods. Accordingly, the present invention has been developed to provide an apparatus, system, and method for initializing a synchronized remote database that overcome many or all of the above-discussed shortcomings in the art.

The apparatus to initialize a synchronized remote database is provided with a plurality of modules configured to functionally execute the steps of creating a first backup table, reading each row from a primary table, constructing a Structured Query Language (SQL) command, and applying each SQL command to the first backup table. These modules in the described embodiments include a creation module, a read module, a construction module, and an application module. The apparatus may also include a verification module, an error mitigation module, and a rename module.

The creation module creates a first backup table of a backup database from a schema for a primary table of a primary database. The read module reads each row from the primary table with an application server configured to manage access to the primary database by a database application.

The construction module constructs a SQL command for each row of the primary table. Each SQL command inserts data of a primary table row in the first backup table. The application module applies each SQL command to the first backup table to mirror the primary table at the first backup table.

In one embodiment, the verification module verifies that each SQL command is is successfully applied to the first backup table. The error mitigation module may mitigate an unsuccessful application of at least one SQL command. In one embodiment, the rename module renames a second backup table of the backup database that is assigned with a table name of the primary table. The rename module may also delete the second backup table of the backup database if each SQL command is successfully applied to the first backup table. The apparatus initializes the backup database so that the backup database may be synchronized with the primary database.

A system of the present invention is also presented to initialize a synchronized remote database. The system may be embodied in one or more enterprise data processing systems. In particular, the system, in one embodiment, includes a primary data processing system and a remote data processing system.

The primary data processing system includes an application server and a database application. The application server manages access to a primary database by the application database. The application server includes a read module and a construction module. The remote data processing system includes a creation module and an application module.

The creation module creates a first backup table of a backup database from a schema for a primary table of the primary database. The read module reads each row from the primary table. The construction module constructs a SQL command for each row of the primary table. Each SQL command inserts data of a primary table row in the first backup table. The application module applies each SQL command to the first backup table to mirror the primary table at the first backup table. The system may mirror one or more primary tables, initializing the backup database for synchronization with the primary database.

A method of the present invention is also presented for initializing a synchronized remote database. The method in the disclosed embodiments substantially includes the steps to carry out the functions presented above with respect to the operation of the described apparatus and system. In one embodiment, the method includes creating a first backup table, reading each row from a primary table, constructing a SQL command, and applying each SQL command to the first backup table.

A creation module creates a first backup table of a backup database from a schema for a primary table of a primary database. A read module reads each row from the primary table with an application server configured to manage access to the primary database by a database application.

A construction module constructs a SQL command for each row of the primary table. Each SQL command inserts data of a primary table row in the first backup table. An application module applies each SQL command to the first backup table to mirror the primary table at the first backup table. The method initializes the synchronized remote backup database so that the backup database can mirror the primary database.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The embodiment of the present invention mirrors a primary database to a remote backup database. The present invention may support the synchronization of the primary database and the backup database. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
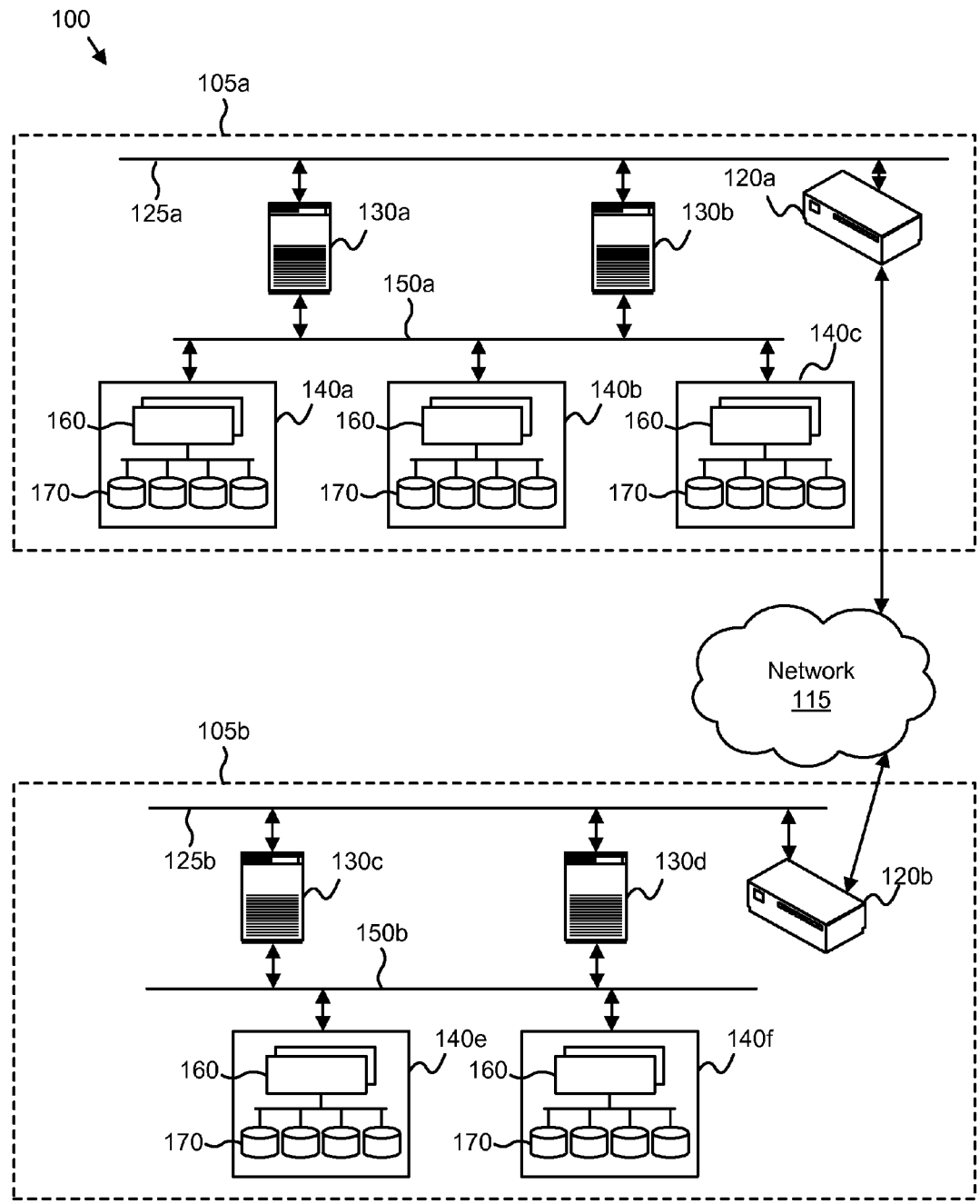
FIG. 1 is a schematic block diagram illustrating one embodiment of data processing systems in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 is a schematic block diagram illustrating one embodiment of data processing systems 100 in accordance with the present invention. Each data processing system 105 is shown with one or more servers 130, one or more routers 120, an internal network 125, a communications channel 150, and one or more storage subsystems 140. Each storage subsystem 140 includes one or more storage controllers 160 and one or more storage devices 170.

The storage devices 170 may store data for the servers 130. The storage controllers 160 may manage the storage devices 170, writing data to and reading data from the storage devices 170. The servers 130 may execute one or more application server software programs. The application server software programs are referred to herein as application servers. The application servers may manage access to the data stored on the storage devices 170.

The data processing systems 105 are shown in communication through a network 115. The network 115 may be the Internet, a private wide area network, or the like. In one embodiment, each data processing system communicates with the network 115 through through a router 120. The servers 130 may communicate with the network 115 through the internal network 125 and the router 120. For example, a first server 130a of a first data processing system 105a may communicate with a third server 130c of a second data processing system 105b through a first internal network 125a, a first router 120a, the network 115, a second router 120b, and a second internal network 125b.

Hereinafter the first data processing system 105a is referred to as a primary data processing system 105a. In one embodiment, data that is to be backed up may originate on the primary data processing system. The second data processing system 105b is referred to as a remote data processing system 105b. The remote data processing system 105b may back up the data from the primary data processing system 105a. In particular, the present invention synchronizes data stored on the remote data processing system 105b with data of the primary data processing system 105a.

Figure 2:
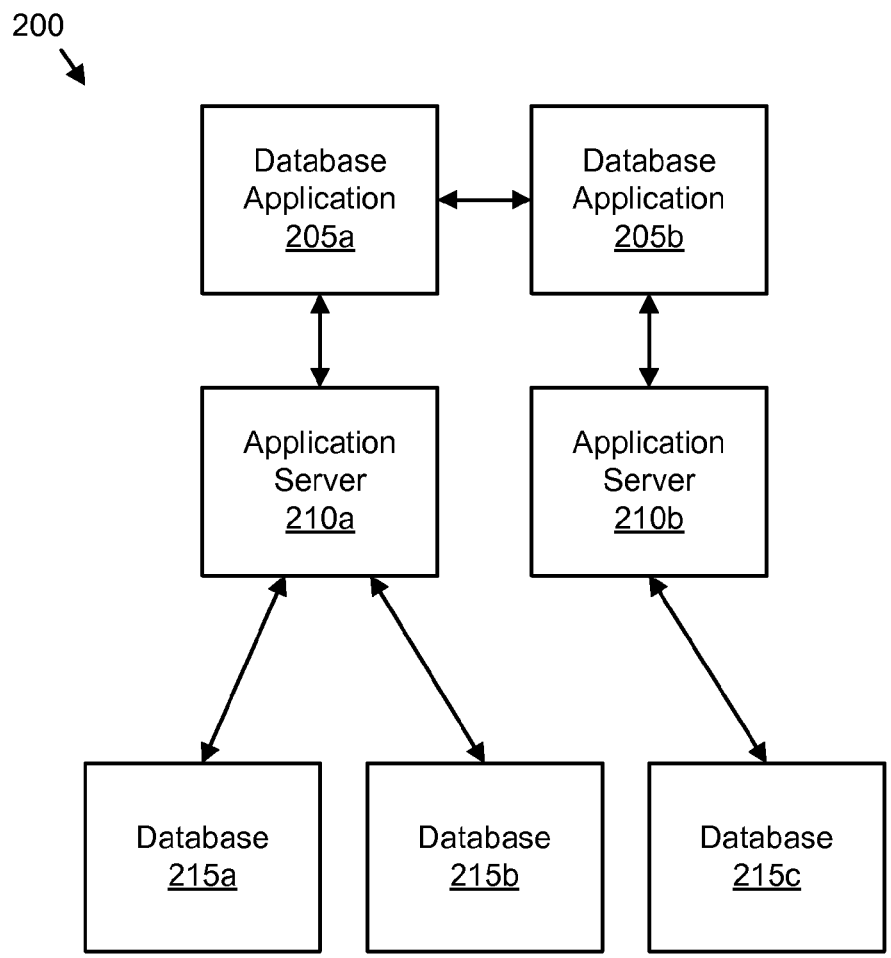
FIG. 2 is a schematic block diagram illustrating one embodiment of an application server system of the present invention.

FIG. 2 is a schematic block diagram illustrating one embodiment of an application server system 200 of the present invention. The description of the system 200 refers to elements of FIG. 1, like numbers referring to like elements. The system 200 includes one or more database applications 205, one or more application servers 210, and one or more databases 215. For simplicity two database applications 205, two application servers 210, and three databases 215 are shown, although any number of database applications 205, application servers 210, and databases 215 may be employed.

In one embodiment, the application servers 210 comprise IBM Websphere Software produced by International Business Machines Corporation (IBM) of Armonk, N.Y. The databases 215 may be stored on the storage devices 170. The application servers 210 may be configured as one or more computer program products comprising a computer useable medium and each having a computer readable program. The computer readable programs may execute on the servers 130. The database applications 205 may also comprise computer program products that execute on the servers 130. Alternatively, the database applications 205 may execute on a remote device.

The database applications 205 are configured to store data in the databases 215 and manipulate the data. For example, a database application 205 may store customer data in a database 215. In addition, the database application 205 may generate invoices from the customer information for delivery to customers.

The application servers 210 manage access to the databases 215. Thus a database application 205 may store data to a database 215 by communicating the data to the application server 210. The application server 210 applies the data to the database 215. In one embodiment, the database application 205 can only access the database 215 through the application server 210.

Figure 3:
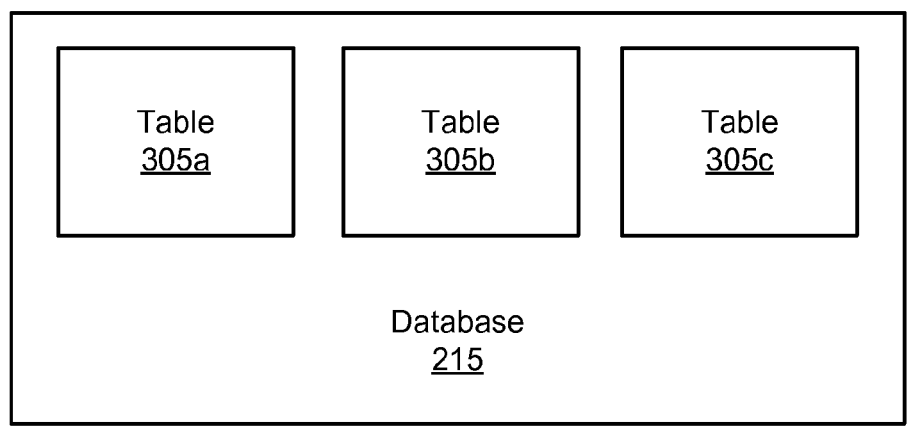
FIG. 3 is a schematic block diagram illustrating one embodiment of a database of the present invention.

FIG. 3 is a schematic block diagram illustrating one embodiment of a database 215 of the present invention. The database 215 is the database of FIG. 2. The description of the database 215 refers to elements of FIGS. 1-2, like numbers referring to like elements. The database 215 includes one or more tables 305 as is well known to those of skill in the art. Each table 305 may include data with a specific organization as will be described hereafter.

Figures 4, 5:
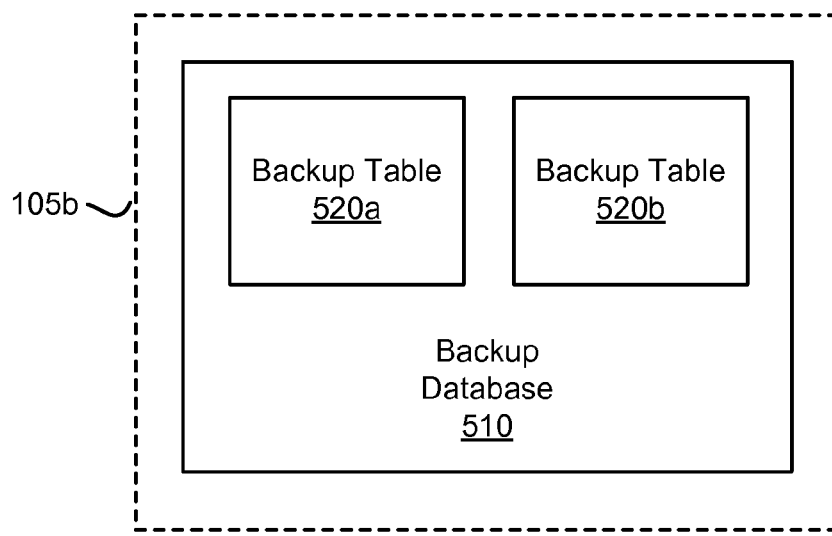
FIG. 4 is a schematic block diagram illustrating one embodiment of a table of the present invention.
FIG. 5 is a schematic block diagram illustrating one embodiment of primary and backup databases of the present invention.

FIG. 4 is a schematic block diagram illustrating one embodiment of a table 305 of the present invention. The table 305 is the table 305 of FIG. 3. As shown, the table 305 includes one or more columns 405 and one or more rows 410. The description of the table 305 refers to elements of FIGS. 1-3, like numbers referring to like elements.

The table 305 may comprise a schema defining the columns 405. Each column 405 may specify a type of data such as integer data, string data, logical data, real number data, and the like for a column 405. In the depicted example, a schema may specify that the table 305 includes a first string column 405a for a first name, a second string column 405b for a last name, and real number column 405c for an account balance.

Each row 410 contains a data field for each column 405. Continuing the depicted example with exemplary data, a first row 410a may store the name 'John' in the first name string column 405a, the name 'Doe' in the last name string column 405b, and the number '245.27' in the account real number column 405c. Similarly, a second row 410b may store the name 'Jane' in the first name string column 405a, the name 'Doe' in the last name string column 405b, and the number '16.05' in the account real number column 405c.

In one embodiment, rows 110 may be dynamically added and deleted from the table 305. In addition, the data stored in the data field columns 405 of a row may be modified. For example, the number in the account real number column 405c of the second row 410b may be modified to '21.96.'

FIG. 5 is a schematic block diagram illustrating one embodiment of primary and backup databases 500 of the present invention. The databases 500 may be the databases 215 of FIG. 2. The description of the databases 500 refers to elements of FIGS. 1-4, like numbers referring to like elements. The databases 500 include a primary database 505 and a backup database 510. The primary database 505 may be used to store active data such as transaction data, customer data, financial data, and the like.

The backup database 510 may be configured to mirror the primary database 505, so that another instance of the primary database 505 is available in case the primary database 505 becomes corrupted, damaged, inaccessible, or the like. For example, the backup database 510 may store substantially the same data in substantially the same organization as the primary database 505. The primary database 505 and the backup database 510 need not be the same type of database. For example, the primary database 505 may be organized as a DB2 Universal Database as provided by IBM while the backup database 510 may be organized as an Oracle Database 10g database as provided by Oracle Corporation of San Mateo, Calif.

By mirroring the primary database 505, the backup database 510 protects the data of the primary database 505. For example, if the primary database 505 becomes inoperable, the backup database 510 may be used in place of the primary database 505 as is well known to those of skill in the art.

The primary database 505 is stored on the primary data processing system 105a. 105a. The backup database 510 is stored on the remote data processing system 105b. For example, the primary database 505 may be stored on storage devices 170 of the primary data processing system 105a while the backup database 510 may be stored on storage devices 170 of the remote data processing system 105b. Although for simplicity only one primary database 505 and one backup database 510 are shown, any number of primary databases 505 and backup databases 510 may be employed.

The primary database 505 and backup database 510 may be organized with tables 305 such as are described for the database 215 of FIG. 3. The primary database 505 includes one or more primary tables 515. Similarly, the backup database 510 includes one or more backup tables 520. The primary tables 515 and the backup tables 520 may be organized with columns 405 and rows 410 as described in FIG. 4.

In one embodiment, selected primary tables 515 are mirrored with backup tables 520 at the backup database 510. For example, a first primary table 515a may store customer data while a second primary table 515b may store transaction data. A first backup table 520a may mirror the customer data of the first primary table 515a while a second backup table 520b may mirror the transaction data of the second primary table 515b.

Although the present invention may initialize any number of backup tables 520 for synchronization with any number of primary tables 515, for simplicity the initializing of one first backup table 520a for synchronization with one primary table 515 will be described. One of skill in the art will recognize that the present invention may initialize any number of backup tables 520 residing in any number of backup databases 510 on any number of remote data processing systems 105b.

Figure 6:
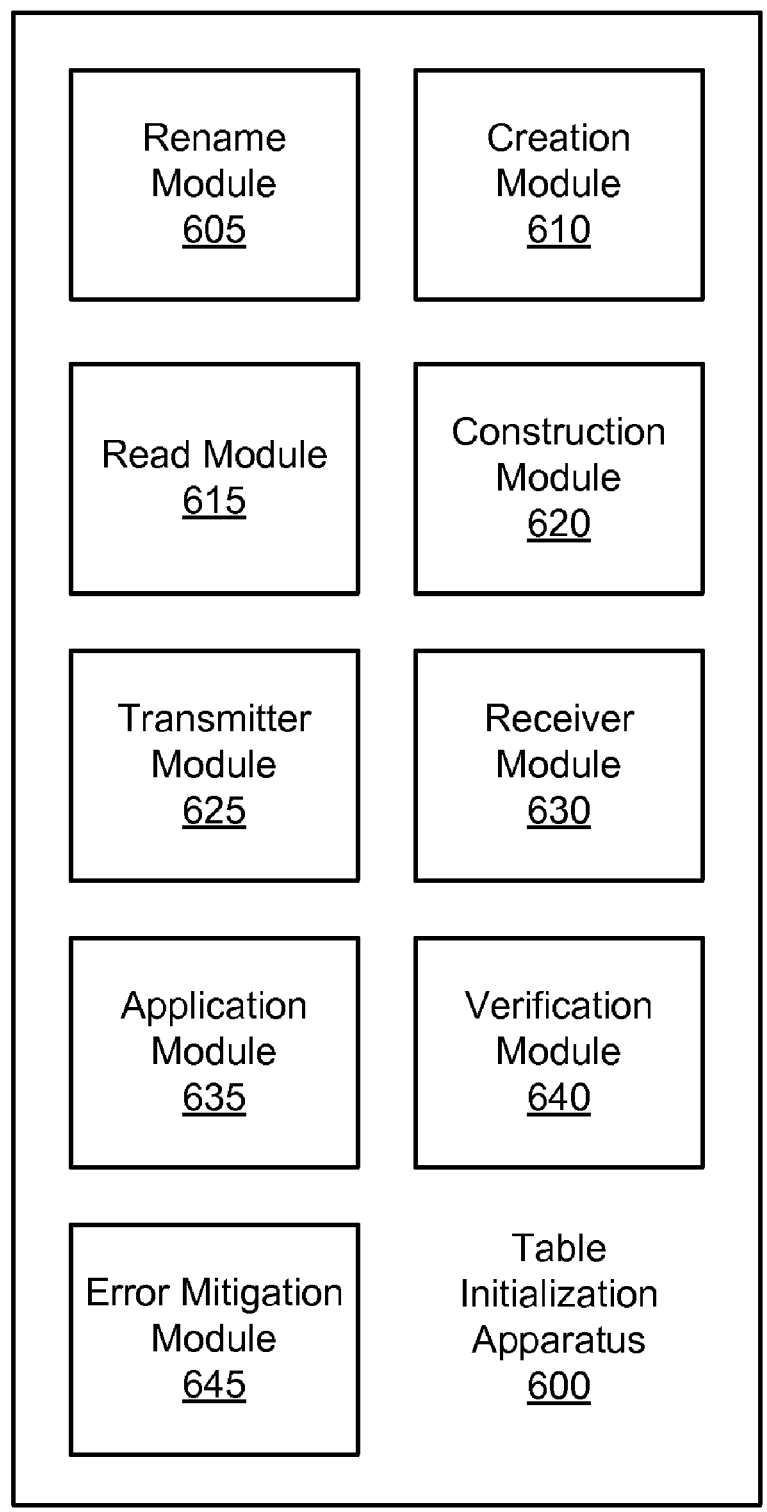
FIG. 6 is a schematic block diagram illustrating one embodiment of a table initialization apparatus of the present invention.

FIG. 6 is a schematic block diagram illustrating one embodiment of a table initialization apparatus 600 of the present invention. The apparatus 600 initializes the backup database 510 by mirroring one or more primary tables 515 of the primary database 505 to the backup database 510. The description of the apparatus 600 refers to elements of FIGS. 1-5, like numbers referring to like elements. The apparatus 600 includes a rename module 605, a module 605, a creation module 610, a read module 615, a construction module 620, a transmitter module 625, a receiver module 630, an application module 635, a verification module 640, and an error mitigation module 645.

In one embodiment, the rename module 605 renames the second backup table 520b of the backup database 510 that is assigned with a table name of the primary table 515. The second backup table 520b may have mirrored the primary table 515 at one time. The rename module 605 may also delete the second backup table 520b if each SQL command is successfully applied to the first backup table 520a as will be described hereafter. In one embodiment, the rename module 605 is configured as one or more computer programs executing on a server 130 of the remote data processing system 105b. In a certain embodiment, the computer programs of the rename module 605 execute on an application server 210 of the remote data processing system 105b.

The creation module 610 creates the first backup table 520a from the schema for the primary table 515. The schema may define one or more columns for the primary table 515. In addition, the schema may define the type of data, the size of a data field, and the like for each column. In one embodiment, the creation module 610 is configured as one or more computer programs executing on a server 130 of the remote data processing system 105b. In a certain embodiment, the computer programs of the creation module 610 execute on an application server 210 of the remote data processing system 105b.

The read module 615 reads each row 410 from the primary table 515 with the application server 210 of the primary data processing system 105a as will be described hereafter. The read module 615 may be configured as one or more computer programs executing on the application server 210.

The construction module 620 constructs a SQL command for each row 410 of the primary table 515. Each SQL command inserts data of a primary table row 410 in the first backup table 520a. In one embodiment, each SQL command is a SQL INSERT command as is well known to those of skill in the art. In one embodiment, the construction module 620 is module 620 is configured as one or more computer programs executing on a server 130 of the primary data processing system 105a. In a certain embodiment, the computer programs of the construction module 620 execute on an application server 210 of the primary data processing system 105a.

In one embodiment, the transmitter module 625 communicates each SQL command to the receiver module 630. The transmitter module 625 may receive the SQL commands from the construction module 620. The receiver module 630 may comprise one or more computer programs executing on a server 130 of the remote data processing system 105b. In a certain embodiment the computer programs of the receiver module 630 execute on an application server 210 of the remote data processing system 105b. The transmitter module 625 may comprise one or more computer programs executing on a server 130 of the primary data processing system 105a, hardware ports to transmit data, and the like.

In a certain embodiment, the transmitter module 625 communicates each SQL command from the first server 130a through the first internal network 125a, the first router 120a, the network 115, the second router 120b, and the second internal network 125b to the receiver module 630 executing on a server 130 of the remote data processing system 105b. In one embodiment, the transmitter module 625 may aggregate a plurality of SQL commands and communicate the aggregated SQL commands to the receiver module 630.

The application module 635 applies each SQL command to the first backup table to mirror the primary table at the first backup table as will be described hereafter. The application module 635 may receiver the SQL commands from the receiver module 630. In one embodiment, the application module 635 is configured as one or more computer programs executing on a server 130 of the remote data processing system 105b. In a certain embodiment, the computer programs of the application module 635 execute on an application server 210 of the remote data processing system 105b.

In one embodiment, the verification module 640 verifies that each SQL command is successfully applied to the first backup table as will be described hereafter. The verification module 640 may be configured as one or more computer programs executing on a server 130 of the remote data processing system 105b. In a certain embodiment, the computer programs of the verification module 640 execute on an application server 210 of the remote data processing system 105b.

In one embodiment, the error mitigation module 645 mitigates an unsuccessful application of at least one SQL command as will be described hereafter. The error mitigation module 645 may be configured as one or more computer programs executing on servers 130 of the primary data processing system 105a and the remote data processing system 105*b*. In a certain embodiment, the computer programs of the error mitigation module 645 execute on application servers 210 of the primary data processing system 105*a* and the remote data processing system 105*b*. The apparatus 600 initializes the backup database 510 so that the backup database 510 may be synchronized with the primary database 505.

The schematic flow chart diagram that follows is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 7:
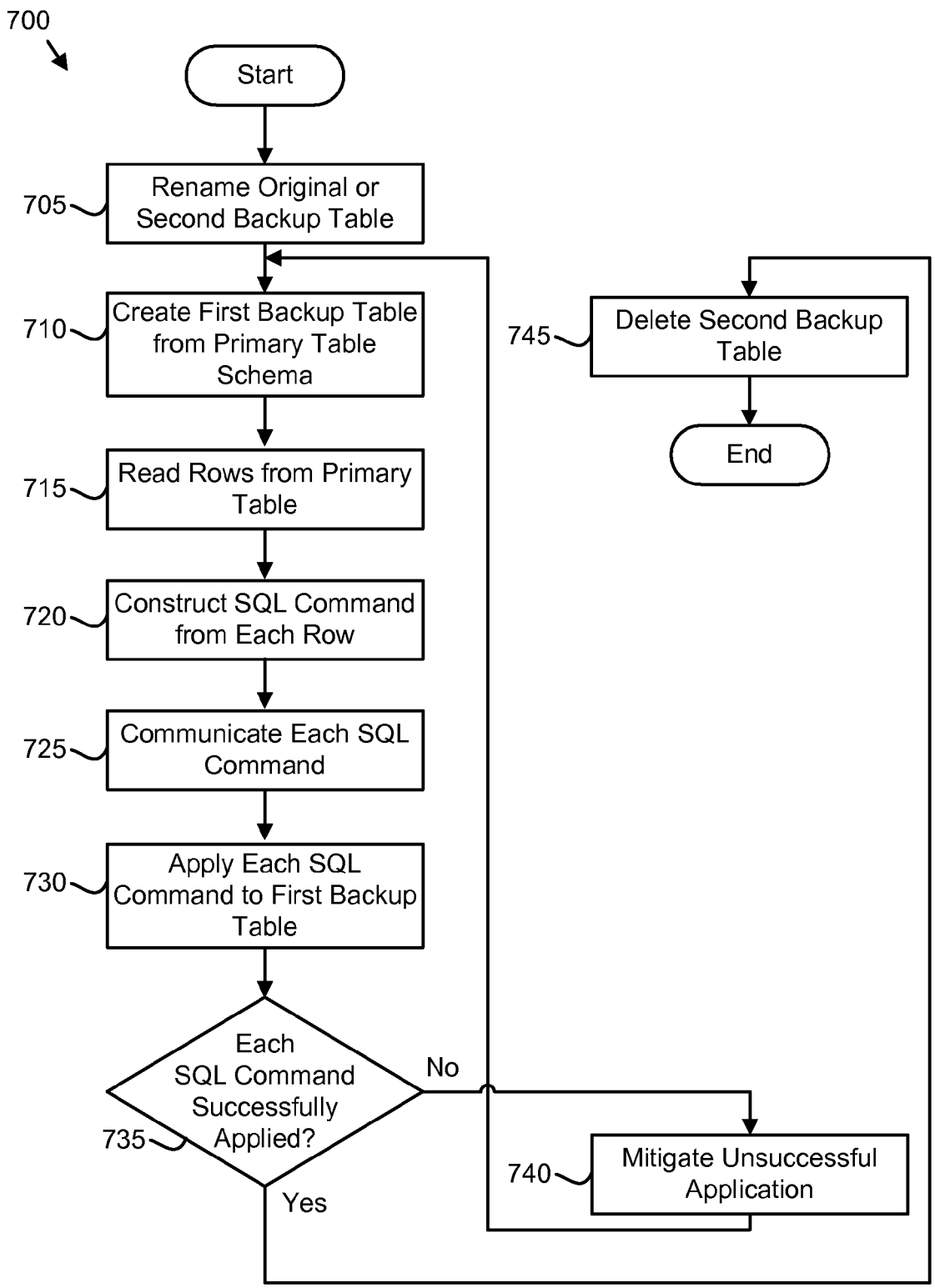
FIG. 7 is a schematic flow chart diagram illustrating one embodiment of a backup database initialization method of the present invention.

FIG. 7 is a schematic flow chart diagram illustrating one embodiment of a backup database initialization method 700 of the present invention. The method 700 substantially includes the steps to carry out the functions presented above with respect to the operation of the described apparatus and system of FIGS. 1-6. The description of the method 700 refers to elements of FIGS. 1-6, like numbers referring to like elements.

In one embodiment, the method 700 is implemented with a computer program product comprising a computer readable medium having a computer readable program. The computer readable program is executed by a computer such as the servers 130.

The method 700 begins, and in one embodiment, the rename module 605 renames 705 the second backup table 520*b* of the backup database 510 that is assigned with the table name of the primary table 515. For example, the primary table 515 may have a table name of "customers." The second backup table 520*b* may also be named "customers." The rename module 605 may rename 705 the second backup table 520*b* "customers_bak" so that the table name "customers" is available within the backup database 510.

The creation module 610 creates 710 the first backup table 520*a* from the schema for the primary table 515. In one embodiment, the creation module 610 names the first backup table 520*a* with the table name of the primary table 515. Continuing the example above, the creation module 610 may name the first backup table 520*a* "customers" after the primary table 515.

The creation module 610 may create 710 columns in the first backup table 520*a* corresponding to each column of the primary table schema. Each column of the first backup table 520*a* may have a configuration that is substantially equivalent to the corresponding column of the primary table 515. For example, if the primary table 515 "customers" comprises the first name string column 405*a* with the column name "first_name," the last name string column 405*b* with the column name "last_name," and the account real number column 405*c* with the column name "account," the creation module 610 may create 710 the first backup table 520*a* using the SQL statement "CREATE TABLE customers (first_name customers (first_name VARCHAR(50), last_name VARCHAR(50), account real);"

The read module 615 reads 715 each row 410 from the primary table 515 with the application server 210. In one embodiment, the read module 615 reads 715 each row 410 with a SQL command. Continuing the example above, the read module 615 may read 715 the rows 410 with the SQL command "SELECT * FROM customers;"

The construction module 620 constructs 720 a SQL command for each row 410 of the primary table 515. Continuing the example above, the construction module 620 may construct 720 the SQL command "INSERT INTO customers (first_name, last_name, account) VALUES ('John', 'Doe', 245.27)" for the data of the first row 410*a* of the table 305 of FIG. 4.

In one embodiment, the transmitter module 625 of the primary data processing system 105*a* communicates 725 each SQL command to the receiver module 630 of the remote data processing system 105*b*. In one embodiment, the transmitter module 625 aggregates a plurality of SQL commands and communicates 725 the aggregated plurality of SQL commands. The aggregated SQL commands may be formatted in a packet, a file such as an XML file, or the like.

The application module 635 applies 730 each SQL command to the first backup table 520*a* to mirror the primary table 515 at the first backup table 520*a*. In one embodiment, the application module 635 applies 730 each SQL command by communicating the SQL commands to the backup database 510. In an alternate embodiment, the application module 635 may communicate each SQL command to a database application that the database application 205 may apply the SQL commands to the backup database 510 through the application server 210.

In one embodiment, the verification module 640 verifies 735 that each SQL command is successfully applied to the first backup table 520*a*. The verification module 640 may verify 735 that each SQL command is successfully applied if no error message is received from the backup database 510 in response to the application 730 of the SQL command.

If the verification module 640 does not verify 735 that each SQL command is successfully applied to the first backup table 520*a*, the error mitigation module 645 may mitigate 740 the unsuccessful application. In one embodiment, the error mitigation module 645 communicates an error message to the application server 210. The application server 210 may stop the construction 720 and communication 725 of SQL commands in response to the error message.

The error mitigation module 645 may declare the first backup table 520*a* is inconsistent. In a certain embodiment, the error mitigation module 645 deletes the first backup table 520*a*. In addition, the mitigation module 645 may rename the second backup table 520*b* with the table name of the primary table 515. The second backup table 520*b* may be consistent with an earlier instance of the primary table 515. In addition, the error mitigation module 645 may loop to the creation module 610 creating 710 the first backup table 520*a* from a schema for the primary table 515.

If the verification module 640 does verify 735 that each SQL command is successfully applied to the first backup table 520*a*, the rename module 605 may delete 745 the second backup table 520*b* and the method 700 terminates. The method 700 may be repeated to mirror a plurality of primary tables 515 to a plurality of backup tables 520. In addition, the method 700 may mirror a plurality of primary databases 505 to a plurality of backup databases 510. The method 700 initializes the remote backup database 510 to mirror the primary database 505.

Figure 8A:
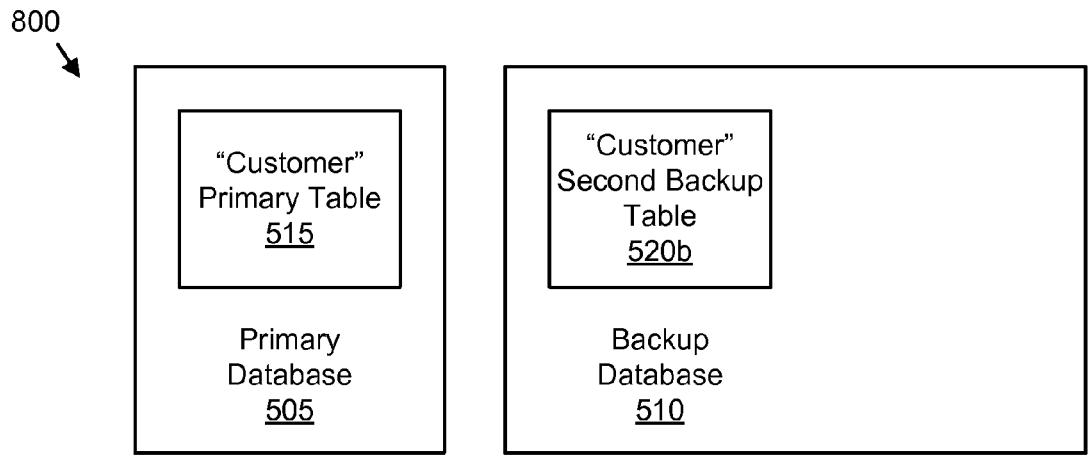
FIGS. 8A-D are schematic block diagrams illustrating one embodiment of a table initialization process of the present invention.
Figure 8B:
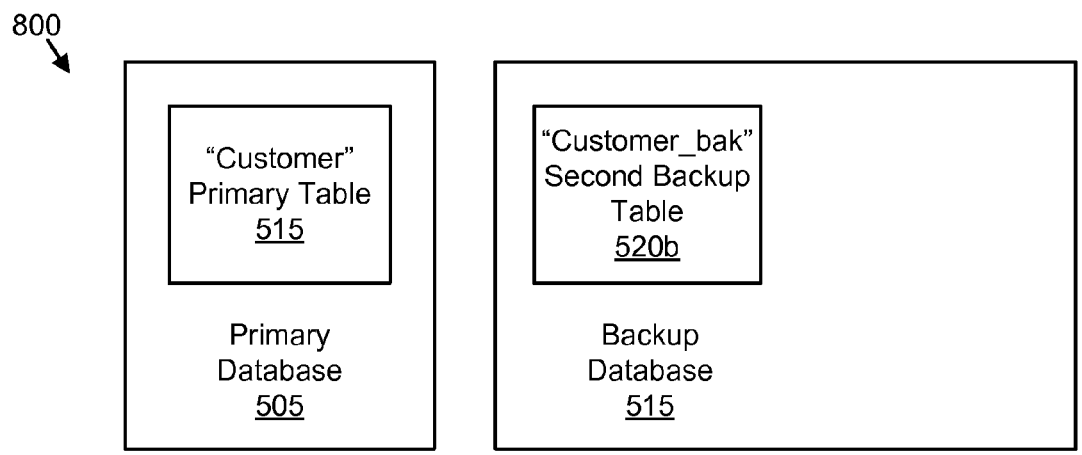

FIGS. 8A-D are schematic block diagrams illustrating one embodiment of a table initialization process 800 of the present invention. The description of the process 800 refers to elements of FIGS. 1-7, like numbers referring to like elements. FIG. 8A shows the primary database 505 with the primary table 515. The primary table 515 has the table name of "customer." The backup database 510 includes second backup table 520*b* with the table name "customer" of the primary table 515. In FIG. 8B, the rename module 605 renames 705 the second backup table 520*b* from "customer" to "customer_bak" so that the second backup table 520*b* does not have the table name of the primary table 515.

Figure 8C:
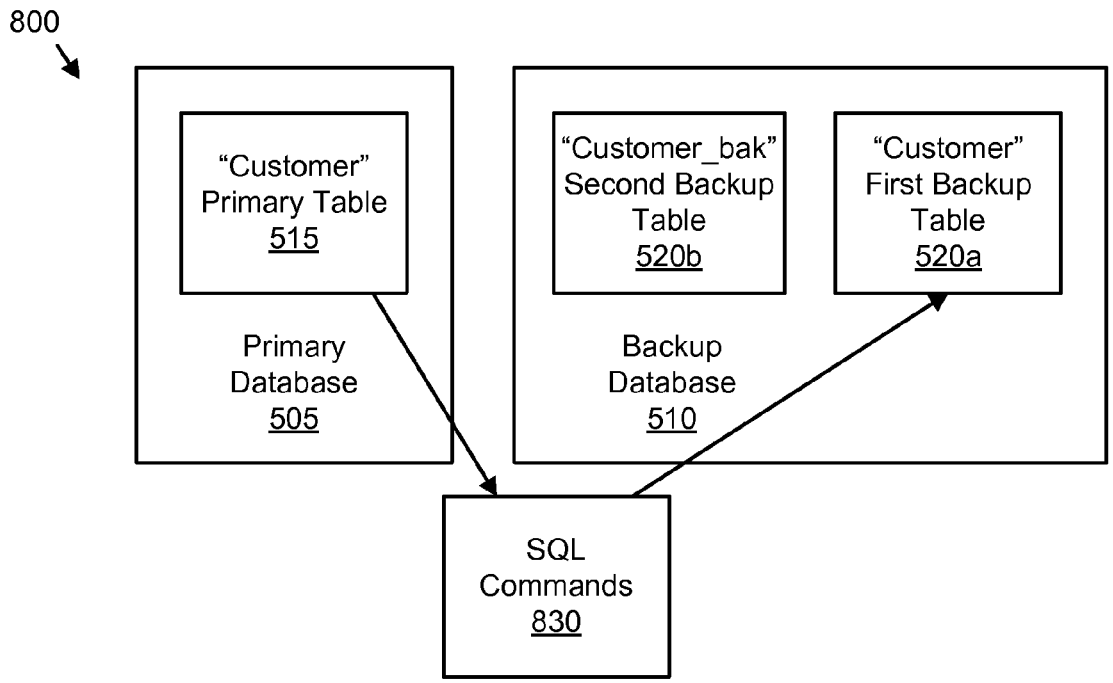

FIG. 8C shows the creation module 610 creates 710 the first backup table 520*a* from the schema for the primary table 515. In addition, the read module 615 reads 715 each row 410 from the primary table 515 and the construction module 620 constructs 720 a SQL command 830 for each row 410 of the primary table 515. The application module 635 applies 730 each SQL command 830 to the first backup table 520*a* to mirror the primary table 515 at the first backup table 520*a*.

Figure 8D:
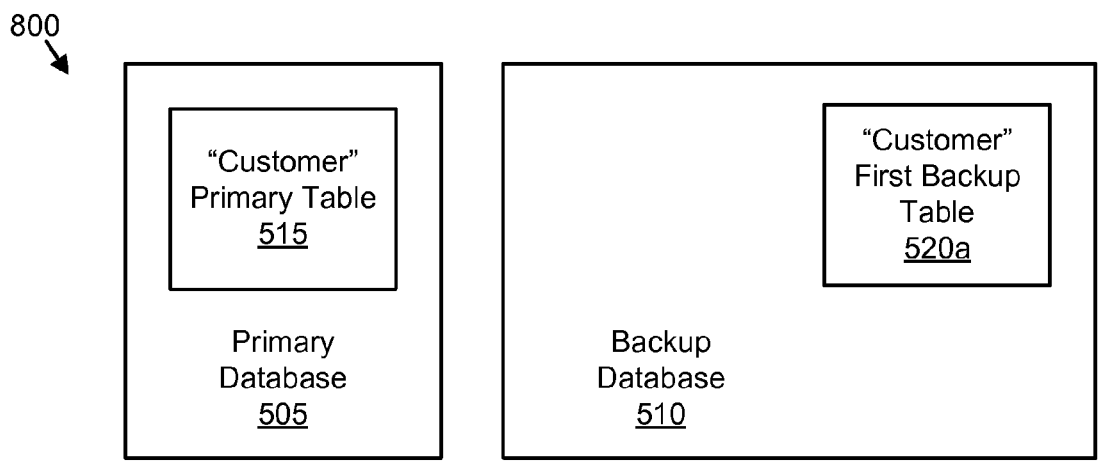

FIG. 8D shows the rename module 605 may delete the second backup table 520*b* if each SQL command 830 is successfully applied to the first backup table 520*a*. The first backup table 520*a* mirrors the primary table 515. The primary table 515 may be synchronized to the first backup table 520*a* to protect the data of the primary table 515. One of skill in the art will appreciate that a plurality of primary tables 515 may be mirrored to a plurality of backup tables 520. In one embodiment, selected primary tables 515 may be mirrored to backup tables 520.

The present invention initializes the remote backup database 510 for synchronization with the primary database 505. The present invention may support the synchronization of the primary database 505 and the remote database 510. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to initialize a synchronized remote database, the apparatus comprising:
  a rename module of a remote data processing system, the rename module configured to rename a first backup table of a backup database of the remote data processing system, the first backup table being renamed from a first name associated with a table name of a primary table of a primary database of a primary data processing system to a second name, the remote and data processing systems being communicable with each other across a network;
  a creation module of the remote data processing system, the creation module configured to create a second backup table of the backup database from a schema for the primary table of the primary database after the first backup table is renamed, the second backup table being assigned a name corresponding with the first name;
  a read module of the primary data processing system, the read module configured to read each row from the primary table with an application server configured to manage access to the primary database by a database application;
  a construction module of the primary data processing system, the construction module configured to construct a Structured Query Language (SQL) command for each row of the primary table, wherein each SQL command is configured to insert data of a primary table row in the second backup table;
  an application module of the remote data processing system, the application module configured to apply each SQL command to the second backup table to mirror the primary table at the second backup table; and
  an error mitigation module configured to mitigate an unsuccessful application of at least one SQL command;
  wherein the rename module is configured to delete the first backup table if each SQL command is successfully applied to the second backup table.

2. The apparatus of claim 1, the apparatus further comprising a verification module configured to verify that each SQL command is successfully applied to the second backup table.

3. The apparatus of claim 1, wherein the rename module is configured to delete the first backup table of the backup database if each SQL command is successfully applied to the second backup table.

4. A computer program product comprising a computer useable medium having a computer readable program, wherein the computer readable program when executed on a computer causes the computer to:
  rename a first backup table of a backup database of a remote data processing system, the first backup table being renamed from a first name associated with a table name of a primary table of a primary database of a primary data processing system to a second name;
  create a second backup table of the backup database from a schema for the primary table of the primary database after the first backup tabled is renamed, the second backup table being assigned a name corresponding with the first name;
  read each row from the primary table with an application server configured to manage access to the primary database by a database application;
  construct a SQL command for each row of the primary table, wherein each SQL command is configured to insert data of a primary table row in the second backup table;
  transmit each SQL command from the primary data processing system to the remote data processing system across a network;
  apply each SQL command to the second backup table to mirror the primary table at the second backup table;
  mitigate an unsuccessful application of at least one SQL command; and
  delete the first backup table of the backup database if each SQL command is successfully applied to the second backup table.

5. The computer program product of claim 4, wherein the primary database and the backup database are of different types.

6. The computer program product of claim 4, wherein each SQL command is configured as a SQL INSERT command.

7. The computer program product of claim 4, wherein the second backup table is assigned a table name of the primary table.

8. The computer program product of claim 7, wherein the computer readable code is further configured to cause the computer to verify that each SQL command is successfully applied to the first backup table.

9. The computer program product of claim 4, wherein the computer readable code is further configured to cause the computer to mitigate an unsuccessful application of the at least one SQL command by:
  communicating an error message to the application server;
  stopping the construction of SQL commands in response to the error message;
  declaring the first backup table is non-consistent; and
  renaming the second backup table with the table name of the primary table so that the second backup table is consistent with an earlier instance of the primary table.

10. The computer program product of claim 4, wherein the first backup table comprises a plurality of first backup tables backing up a plurality of primary tables selected from among primary tables of the primary database.

11. A system to initialize a synchronized remote database, the system comprising:
  a primary data processing system comprising
    an application server configured to manage access to a primary database;
    a database application configured to access the primary database through the application server;
    the application server further comprising
      a read module configured to read each row from a primary table of the primary database;
      a construction module configured to construct a SQL command for each row of the primary table, wherein each SQL command is configured to insert data of a primary table row in a first backup table of a backup database;
  a remote data processing system comprising
    a creation module configured to create the first backup table from a schema for the primary table;
    an application module configured to apply each SQL command to the first backup table to mirror the primary table at the first backup table; and
    an error mitigation module configured to mitigate an unsuccessful application of at least one SQL command.

12. The system of claim 11, the remote data processing system further comprising a verification module configured to verify that each SQL command is successfully applied to the first backup table.

13. The system of claim 11, the remote data processing system further comprising a rename module configured to rename a second backup table of the backup database that is assigned with the table name of the primary table and delete the second backup table of the backup database if each SQL command is successfully applied to the first backup table.

14. A method for deploying computer infrastructure, comprising integrating computer-readable code into a computing system, wherein the code in combination with the computing system is capable of performing the following:
  renaming a first backup table of a backup database that is assigned with a table name of a primary table of a primary database;
  creating a second backup table for the backup database from a schema for the primary table and assigning the table name of the primary table to the second backup table;
  reading each row from the primary table with an application server configured to manage access to the primary database by a database application;
  constructing a SQL command for each row of the primary table, wherein each SQL command is configured to insert data of a primary table row in the second backup table;
  transmitting each SQL command from a primary data processing system comprising the primary database across a network to a remote data processing system comprising the remote database;
  applying each SQL command to the second backup table to mirror the primary table at the second backup table;
  mitigating an unsuccessful application of at least one SQL command;
  verifying that each SQL command is successfully applied to the second backup table; and
  deleting the first backup table of the backup database if each SQL command is successfully applied to the second backup table.

15. The apparatus of claim 1, wherein the error mitigation module mitigates an unsuccessful application of the at least one SQL command by:
  communicating an error message to the application server;
  stopping the construction of SQL commands in response to the error message;
  declaring the first backup table is non-consistent; and
  renaming the second backup table with the table name of the primary table so that the second backup table is consistent with an earlier instance of the primary table.

16. The system of claim 11, wherein the error mitigation module mitigates an unsuccessful application of the at least one SQL command by:
  communicating an error message to the application server;
  stopping the construction of SQL commands in response to the error message;
  declaring the first backup table is non-consistent; and
  renaming a second backup table with the table name of the primary table so that the second backup table is consistent with an earlier instance of the primary table.

17. The method of claim 14, wherein mitigating an unsuccessful application of at least one SQL command comprises communicating an error message to the application server, stopping the construction of SQL commands in response to the error message, declaring the first backup table is non-consistent, and renaming the second backup table with the table name of the primary table so that the second backup table is consistent with an earlier instance of the primary table.

* * * * *